United States Patent [19]

Wubbe

[11] 3,900,916

[45] Aug. 26, 1975

[54] DOUBLE LATCH CONNECTOR

[75] Inventor: Leo J. Wubbe, Beverly Shores, Ind.

[73] Assignee: The Anderson Company, Gary, Ind.

[22] Filed: Sept. 23, 1974

[21] Appl. No.: 508,429

[52] U.S. Cl. ............................................. 15/250.32
[51] Int. Cl.² ............................................. B60S 1/40
[58] Field of Search ......... 15/250.31–250.35, 250.42

[56] References Cited
UNITED STATES PATENTS

| | | | |
|---|---|---|---|
| 2,751,620 | 6/1956 | Ehrlich | 15/250.32 |
| 2,807,822 | 10/1957 | Scinta | 15/250.32 |
| 2,915,770 | 12/1959 | Scinta | 15/250.32 |
| 3,378,874 | 4/1968 | Scinta | 15/250.32 |
| 3,608,124 | 9/1971 | Morton | 15/250.32 |
| 3,780,394 | 12/1973 | Quinlan et al. | 15/250.32 |
| 3,831,222 | 8/1974 | Kushida | 15/250.32 |

Primary Examiner—Peter Feldman
Attorney, Agent, or Firm—Wegner, Stellman, McCord, Wiles & Wood

[57] ABSTRACT

A double latching connector for connecting a straight end wiper arm to a wiper blade has a housing with a body portion pivotally connected to the superstructure of the blade. The connector has upper and lower halves separated from each other but joined at one end to the body portion of said housing. A downwardly depending actuator member is connected to the upper half and an upwardly projecting actuator member is connected to the lower half. The wiper arm with a straight end portion has a recess in the lower surface and a lug on the upper surface which engage, respectively, with a lug on the lower half and in a recess in the upper half of the connector. Urging the two actuator members toward each other will spread the opening between the upper and the lower halves to release the lugs from the recesses thereby making it possible to disconnect the arm from the connector.

9 Claims, 11 Drawing Figures

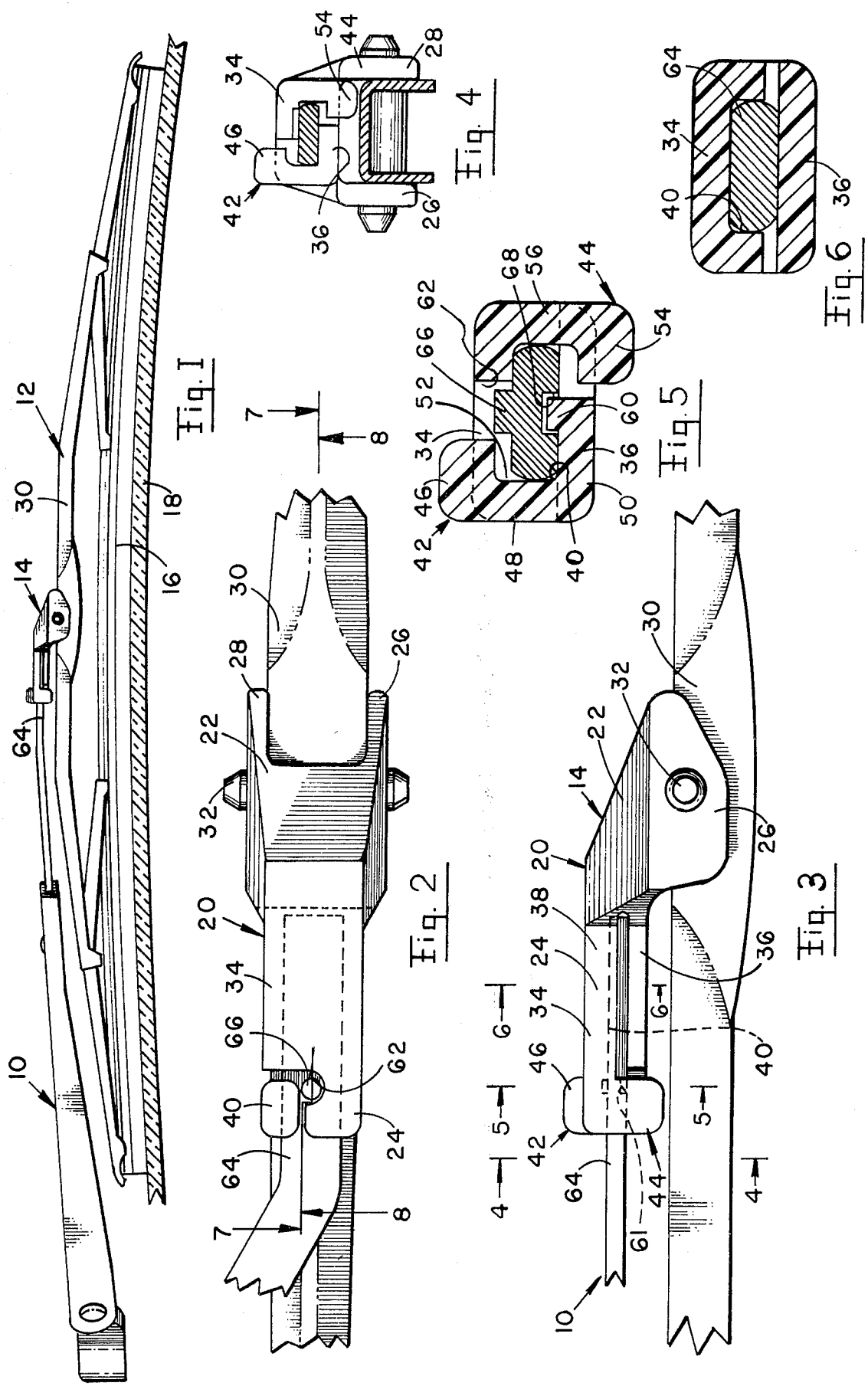

DOUBLE LATCH CONNECTOR

BACKGROUND OF THE INVENTION

1. Field of the Invention

This invention relates to connectors for windshield wiper blades and, more particularly, to a double latching connector for connecting a wiper blade to a wiper arm.

2. Description of the Prior Art

In the glass cleaning art and, in particular, in the automotive field, one well known style of wiper arm has a straight end at the outboard portion which end has an upstanding lug on the top surface and a recess aligned therewith on the bottom surface thereof. The straight end of the arm is inserted in a connector on a wiper blade which connector has, in one type, a spring bearing against the lower surface of the arm urging the lug into a recess in the housing of the connector, and in another type, has a spring bearing against the top of the arm with a recess in the spring engaging the lug on the arm, and in still another type, has a spring engaging around the end of the arm and having an aperture into which the lug on the arm end nests. There are other various modifications of connector for engaging with the lug and the recess on the straight end of the arm for attaching the wiper blade to the arm.

With these currently designed connectors for straight end arms, when it is desired to remove the arm from the blade, it is necessary to specially maneuver the arm relative to the connector or to actuate a lever which is generally connected to the spring to maneuver the spring so that the lug is disconnected from the recess in the connector.

Although many of the current connectors have been adequate for holding the straight end of the arm connected to the blade and the release mechanisms, for disconnecting the connector from the arm end, have been operative, there are times when the location of the lever with respect to the arm and blade and windshield makes it difficult to maneuver the lever to effect the disconnecting function. This is particularly true where it is necessary to actuate the relatively small lever which is located between the arm and the blade with the arm and blade parked in the center of a large windshield and where the disconnect is to be effected on a cold winter day. It is necessary for the attendant to lean across the hood of the car and remove his glove in order to reach and actuate the lever for disconnecting the arm from the blade.

The other systems that have the so-called double latching arrangement require not only depressing the lever beneath the arm, but also require that the arm be pivoted relative to the connector so as to release both connecting portions of the connector. Once again, on a cold day it is difficult, if not impossible, to effect the disconnect.

SUMMARY OF THE INVENTION

The present invention overcomes the disadvantages of the prior art and still provides an affective, double latch connection between the straight end of a wiper arm and a wiper blade. This is accomplished by providing the connector with an upper and lower half, with the lower half having an extension at its free end projecting above the plane of the top surface of the top half and the upper half has on its free end a downwardly depending member which extends below the plane of the bottom surface of the bottom half such that squeezing the raised member and the depending member toward each other disconnects a lug mounted on the lower half which is nested in the recess on the bottom surface of the straight end arm and moves the opening into which the lug on the top surface of the straight end arm is nested out of alignment with said lug so that the straight end arm can be longitudinally moved out of the connector.

With our improved connector design, all that is necessary to disconnect the double latching arrangement from the two connecting portions on the straight end arm is to squeeze two elements together sufficient to disconnect the lugs from the recesses. Since a squeezing motion is much easier to execute even when it is necessary to stretch across the long expanse of a large car's hood, it can still be done even wearing gloves in the coldest of weather. If the parts can be reached, the arm can be disconnected from the blade without freezing the hands of the attendant and without tearing finger nails and the like.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is an elevational view of a windshield wiper arm connected to a windshield wiper blade mounted on a windshield showing our improved connector between the arm and the blade;

FIG. 2 is an enlarged plan view of our connector with portions of the arm blade broken away;

FIG. 3 is an elevational view of the connector and of the arm and blade portions of FIG. 2;

FIG. 4 is a cross-sectional view taken along the lines 4—4 of FIG. 3;

FIG. 5 is a cross-sectional view taken along the lines 5—5 of FIG. 3;

FIG. 6 is a cross-sectional view taken along the lines of 6—6 of FIG. 3;

DESCRIPTION OF THE PREFERRED EMBODIMENT

Figure 7:
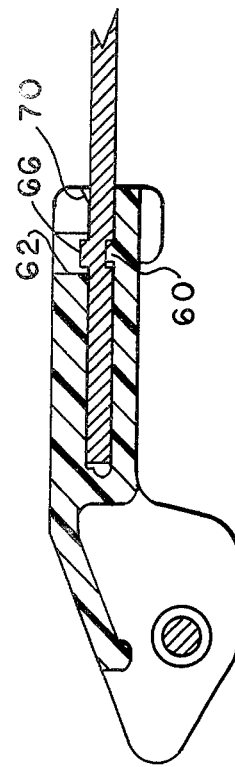
FIG. 7 is a cross-sectional view taken along the lines 7—7 of FIG. 2.

Referring to the drawings and, in particular, to FIGS. 1 through 6, a windshield wiper arm 10 is shown connected to a windshield wiper blade 12 by means of a connector 14. The wiper blade 12, in the illustrated form is a triple yoke construction and has a resilient wiping element 16 bearing against the surface of a windshield 18 so that as the wiper arm is reciprocated across the surface of the windshield, the wiper blade will wipe an area traverse by said wiper element 16. As best shown in FIGS. 2 and 3, the connector 14 has a housing 20 which includes a body portion 22 and a latching portion 24. The body portion 22 has a pair of downwardly depending bifurcated arms 26 and 28 which are adapted to straddle the inverted U-shaped primary yoke 30 of the wiper blade. The connector 14 is pivotally connected to said primary yoke 30 by means of a pin 32 passing through aligned openings in the bifurcated arms of the body portion 22 and through the sidewalls of the inverted U-shaped channel portion of the primary yoke of the wiper blade.

The latching portion 24 of the connector 14 is divided into an upper half 34 and a lower half 36 which are separated longitudinally at the midportions 38 of said latching portion along a horizontal plane. The upper half 34 and lower half 36 are each connected at one end to the body portion 22 and project outwardly therefrom. A longitudinal opening 40 is formed between said upper half 34 and lower half 36 and extends inwardly to the body portion 22. Remote from the body portion 22 on the latching portion 24 is a pair of actuating members 42 and 44. The actuating member 42 has a raised member 46 extending above the plane of the top surface of the upper half 34 and is connected by a side 48 to the outer end portion 50 of the lower half 36. The side 48 has a cutout portion which forms a wall 52 which is an extension of the longitudinal opening 40. The actuating member 44 has a depending member 54 projecting below the bottom surface of the lower half 36 and is connected to the upper half 34 by means of the side 56. The actuating member 44 has a cutout in the vicinity of the side 56 which defines a wall forming an extension of the longitudinal opening 40 in the latching portion 24. The cutouts in the sides 48 and 56 have a vertical dimension at least equal to the vertical height of the longitudinal opening 40 plus an amount slightly greater than the distance the lug on the end of the wiper arm extends out from the top surface of the wiper arm (as will be described in greater detail hereinafter).

The lower half 36 of the latching portion 24 has an upwardly extending lug 60 projecting into the longitudinal opening 40. The lug 60 has a slightly tapered surface 61 facing the open end of the longitudinal opening 40. The upper half 34 has an opening 62 formed therethrough in alignment with the lug 60 on the lower half 36. As can best be seen in FIG. 2, the opening 62 is formed somewhat as a recess in the upper half 34 which recess is closed by the raised member 46 of the upwardly projecting actuator member 42 so that a lug on a wiper arm nested in the opening 62 cannot escape sideways from said opening.

As shown in FIG. 4, the actuator members 42 and 44 are split vertically in such a way that the raised member 46 is connected to the lower half 36 completely independent of the connection between the depending member 54 which is connected to the upper half 34. As shown in FIG. 6, the upper half 34, in which the opening 40 is formed, is separated from the lower half 36 and is spaced therefrom by an appropriate amount. The lower half 36 and upper half 34 are biased toward each other to grip the end portion of the wiper arm therebetween.

The windshield wiper arm 10 is connected to a pivot shaft projecting outwardly from the vehicle and has an outer straight end portion 64. The portion 64 has a lug 66 centrally disposed with respect to each side and projecting upwardly therefrom a predetermined amount.

The lug 66 is spaced from the outer end of the arm by a predetermined amount that has become somewhat standard in the industry. The lug 66 projects upwardly from the upper planar surface of the outer end of the arm and is in alignment with a recess 68 formed in the lower face or lower surface of said arm end 64. It is contemplated that in the event the recess 68 and the lug 66 are not in alignment with each other, accommodations for this can be made by misaligning the lug 60 and the opening 62 in the connector 14 by an equal amount.

In assembling the arm 10 to the blade 12, the outer end 64 of the arm is aligned with the mouth of the longitudinal opening 40 and is forced longitudinally into said opening until the end of the arm engages with the tapered edge 61 of the lug 60 on the lower half 36 so that further force on the arm relative to the connector will deflect the lower half 36 downward with respect to the upper half 34 until the arm end rides over the top of the lug 60. The arm end is moved further into the opening 40 until the lug 66 engages with the tapered edge 70 of the end face of the upper half 34 (see FIGS. 7 and 7A) of the latching portion 24. The arm end and the lower half 36 at this point are deflected with respect to the upper half 34 to clear the lug 66 from the end face whereupon the arm end 64 may be forced all the way into the longitudinal opening 40 until the lug 66 snaps into the opening 62 in the upper half 34 and the lug 60 snaps into the recess 68 in the lower surface of the wiper arm. In this way, the arm will be connected with a double latching arrangement in the connector and to the blade.

Figure 8:
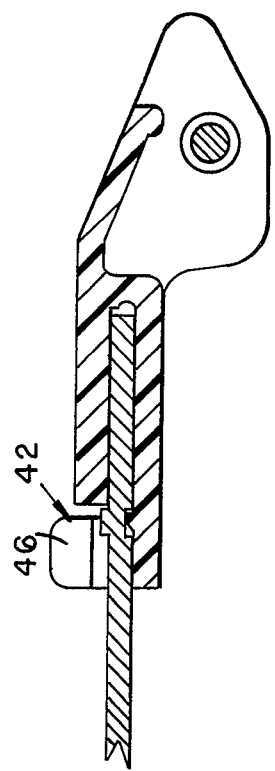
FIG. 8 is a cross-sectional view taken along the lines 8—8 of FIG. 2.
Figure 7A:
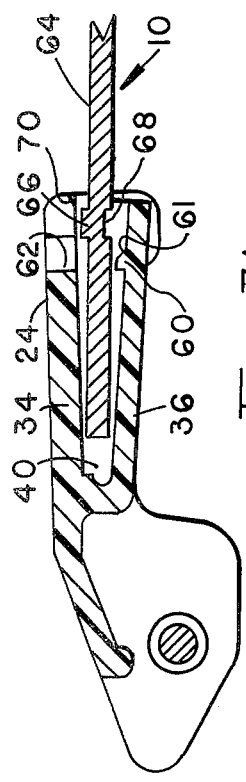
FIG. 7A is an action view of FIG. 7 showing the connector opened to a disconnect condition.
Figure 8A:
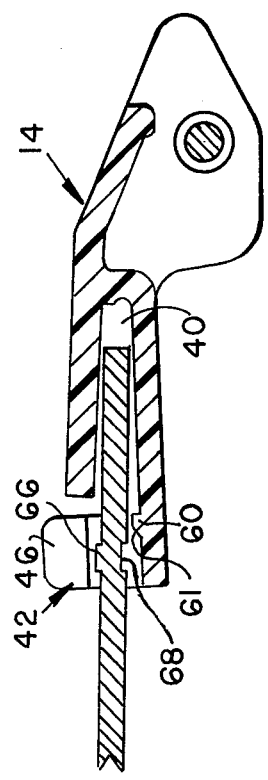
FIG. 8A is a view similar to FIG. 8 only showing the connector in the disconnect condition with respect to an arm.

FIGS. 8 and 8A illustrate two views similar to FIGS. 7 and 7A to show how the arm end is unlatched from the connector. In FIG. 8 the arm end is latched and in FIG. 8A, when the actuating members 42 and 44 are squeezed relative to each other, the lug 60 will be disengaged from the recess 68 in the bottom of the arm and the lug 66 on the top of the arm will be removed from the opening 62 in the upper half 34 so that the arm can be removed from the connector.

Figure 9:
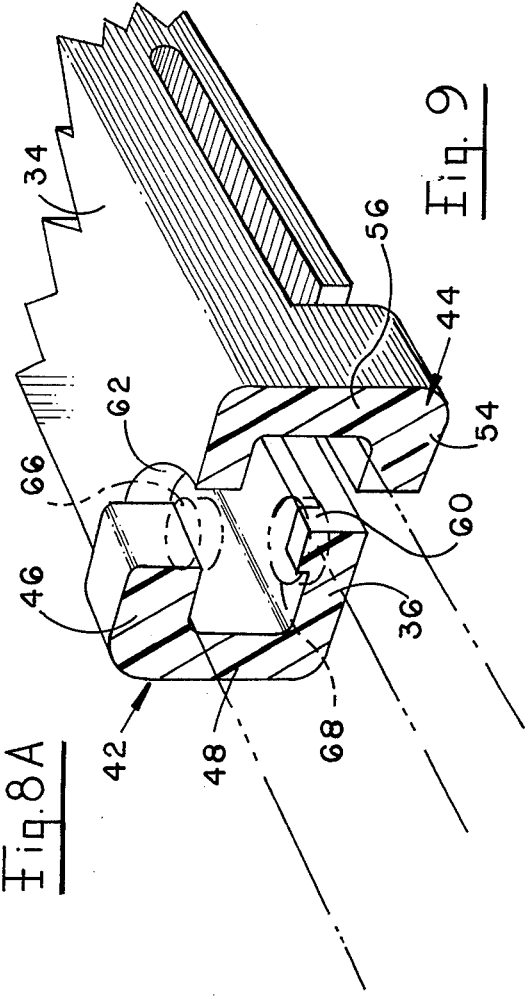
FIG. 9 is a perspective view of the actuator and latching end of our connector with parts shown in section.

FIG. 9 is a perspective view of the critical operating parts of our invention and, in particular, illustrates the relationship between the actuators 42 and 44 with the raised member 46 projecting above the top surface of the upper half and being connected at 48 to the lower half 36 and with the depending member 54 projecting below the surface of the lower half and being connected at 56 to the upper half 34. The relationship of the lugs 60 and 66 in the recess 68 and the opening 62, respectively, is shown. The structure is such that squeezing the actuating members 42 and 44 toward each other will deflect the upper half 34 about its connecting end to the body portion 22 upwardly and will deflect the lower half 36 about its connecting end to the body portion 22 downwardly with respect thereto so as to open or enlarge the mouth of the longitudinal opening 40 to permit the lugs 60,66 to clear the walls of the recess 68 and opening 62 and permit the arm to be removed from the connector.

An operator, no matter where the arm is parked on the windshield of a vehicle, can grasp the end of the arm and squeeze the actuator members 42 and 44 relative to each other and at the same time move the blade and the connector away from the end of the arm, thereby disconnecting the connector and the blade from the end of the arm. The actuator elements 42 and 44 may be squeezed by an operator having gloves, greasy fingers, and the like, and no special tools are required. It is not necessary to use a fingernail or a screwdriver to reach between the arm and the connector to disconnect the connector from the arm end as was true heretofore.

The connector 14 is made of molded plastic material such as polycarbonate or the like, or it may be made from certain types of metals which would have the necessary springiness to engage with the lugs during use and still have sufficient resilience to be deflected sufficient to disconnect the connector from the arm end.

I claim:

1. A connector for a windshield wiper blade, an elongate housing having a body portion pivotally connected to said wiper blade, said housing having a longitudinal opening extending inward from the end opposite said body portion, said housing having an upper half and a lower half, an actuator member connected to the outer end portion of said lower half, a second actuator member connected to the outer end portion of said upper half, said actuator members projecting in opposite directions and being adapted to be urged toward each other to enlarge the opening between said upper and lower halves, a lug formed on the upper surface of said lower half and projecting into said longitudinal opening in said housing, and an opening formed in said upper half in alignment with said lug.

2. A connector as claimed in claim 1 wherein said first named actuator member projects above the top surface of said upper half and said second actuator member projects below the bottom surface of said lower half.

3. A connector as claimed in claim 2 wherein each said actuator member extends around and forms one wall of the open end of the longitudinal opening.

4. A connector as claimed in claim 1 wherein the lug on the lower half has a tapered surface facing the mouth of the longitudinal opening.

5. A connector as claimed in claim 4 wherein the end wall of the upper half has a tapered surface into the mouth of the longitudinal opening.

6. In a connector for connecting a windshield wiper arm to a wiper blade, an elongate housing having a body portion with downturned bifurcated arms pivotally connected to the wiper blade, said housing having a longitudinal opening extending inward from the end opposite said body portion, said housing being divided along a horizontal plane into an upper half and a lower half, a raised member projecting above the top surface of said upper half and being connected to said lower half, said raised member extending around and forming one wall of said longitudinal opening, a depending member projecting below the bottom surface of said lower half and being connected to the outer end portion of said upper half, said depending member extending around and forming another wall of said longitudinal opening, a lug formed on the upper surface of said lower half and projecting into said opening, and an opening formed in said upper half in alignment with said lug whereby the outer end portion of a wiper arm having a recess in a lower face and having a lug formed on an upper face is assembled with the connector by means of the lug on the lower half of the housing engaging in said recess in the lower face of said arm and said lug on the upper face of said arm engaging in the opening in the upper half of said housing.

7. In a connector for connecting a windshield wiper arm to a wiper blade, an elongate housing pivotally connected to the wiper blade, a remote portion of said housing being divided vertically and having a raised actuator portion on one side and a downwardly depending actuator portion on the other side, the midportion of said housing being divided along a horizontal plane into an upper half and a lower half, the raised actuator portion being connected to the lower half and the depending actuator portion being connected to the upper half of said housing, an upwardly projected lug formed on said lower half and an opening formed in said upper half in alignment with said lug whereby the outer end portion of a wiper arm having a recess in a lower surface and a lug on the upper surface is assembled with the connector by seating the lug on the arm in the opening in the upper half and by seating the lug on the lower half in the recess in the lower surface of said arm.

8. In a connector as claimed in claim 7 wherein the lug on the lower half of the housing has a taper in alignment with the opening in the housing which is engaged by the end of the arm being inserted into the opening to deflect the lower half of the housing downwardly relative to the upper half to permit the arm to advance into the connector.

9. In a connector as claimed in claim 8 wherein the facing end of the upper half has a tapered surface into the opening which surface engages and guides the lug on the arm end into the opening as the upper half is deflected upwardly relative to the arm end and the lower half.

* * * * *